United States Patent
Ahn et al.

(10) Patent No.: US 12,147,550 B2
(45) Date of Patent: Nov. 19, 2024

(54) STEGANOGRAPHY METHOD

(71) Applicant: Defense Agency for Technology and Quality, Gyeongsangnam-do (KR)

(72) Inventors: Jin Woo Ahn, Gyeongsangnam-do (KR); Sang Woo Noh, Gyeongsangnam-do (KR); Tae Hwan Kim, Gyeongsangnam-do (KR)

(73) Assignee: Defense Agency for Technology and Quality, Gyeongsangnam-do (KR)

( * ) Notice: Subject to any disclaimer, the term of this patent is extended or adjusted under 35 U.S.C. 154(b) by 221 days.

(21) Appl. No.: 17/897,246

(22) Filed: Aug. 29, 2022

(65) Prior Publication Data

US 2023/0066458 A1    Mar. 2, 2023

(30) Foreign Application Priority Data

Aug. 30, 2021    (KR) ........................ 10-2021-0114766

(51) Int. Cl.
| | |
|---|---|
| *G06F 21/60* | (2013.01) |
| *G06N 3/045* | (2023.01) |
| *G06N 3/08* | (2023.01) |
| *G06V 10/74* | (2022.01) |
| *G06V 10/82* | (2022.01) |
| *G06V 20/00* | (2022.01) |
| *H04N 19/467* | (2014.01) |

(52) U.S. Cl.
CPC ............ *G06F 21/606* (2013.01); *G06N 3/08* (2013.01); *G06V 10/761* (2022.01); *G06V 10/82* (2022.01); *G06V 20/95* (2022.01); *H04N 19/467* (2014.11)

(58) Field of Classification Search
CPC .. G06F 21/606; H04N 19/467; G06V 10/761; G06V 10/82; G06N 3/08

USPC ........................................................ 726/26
See application file for complete search history.

(56) References Cited

FOREIGN PATENT DOCUMENTS

| JP | 2021005745 | * | 4/2020 |
|---|---|---|---|
| KR | 20200046182 | * | 2/2020 |

OTHER PUBLICATIONS

Supplementary European Search Report and the European Search Opinion Dated Jan. 5, 2023 From the European Patent Office Re. U.S. Appl. No. 17/897,246. (8 Pages).
Yu "Attention Based Data Hiding with Generative Adversarial Networks", Proceedings of the AAAI Conference on Artificial Intelligence, 34(01): 1120-1128, Apr. 3, 2020.
SSteGan "SSteGAN: Self-Learning Steganography Based on Generative Adversarial", Integrated Steganography and Steganalysis, p. 8-14, Nov. 18, 2018.

* cited by examiner

*Primary Examiner* — Monjur Rahim

(57) ABSTRACT

A steganography method and an apparatus embedding a hidden message in a video stream of an original cover video to produce a stego video using a generative neural network. The original cover video is a video stream as opposed using an image. A discriminant neural network is used to correct a generated video compared to an original cover video. The generated neural network is trained when the generated video is determined to be real by the discriminant neural network. A second stego video is acquired by adversarial training through a mutually adversarial relationship between a generative neural network and an discriminant neural network. The embedding technique is one of pre-embedding, intra-embedding, or post-embedding.

9 Claims, 3 Drawing Sheets

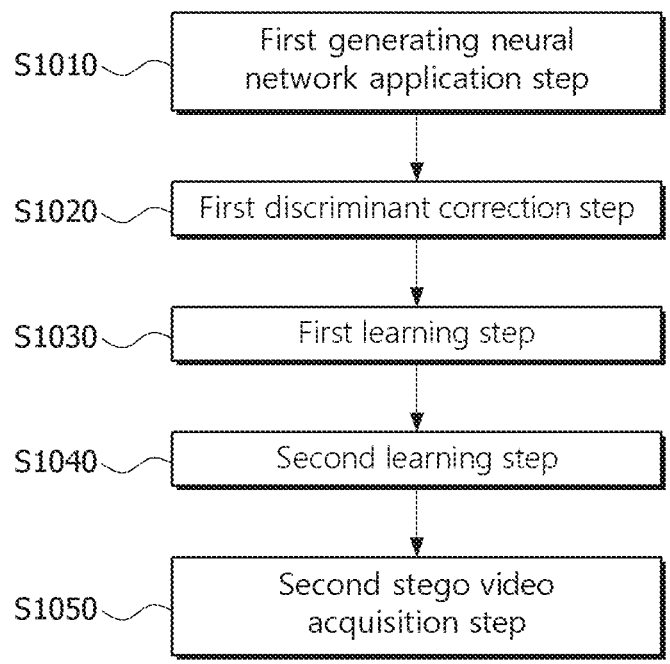
[Figure 1]

[Figure 2]
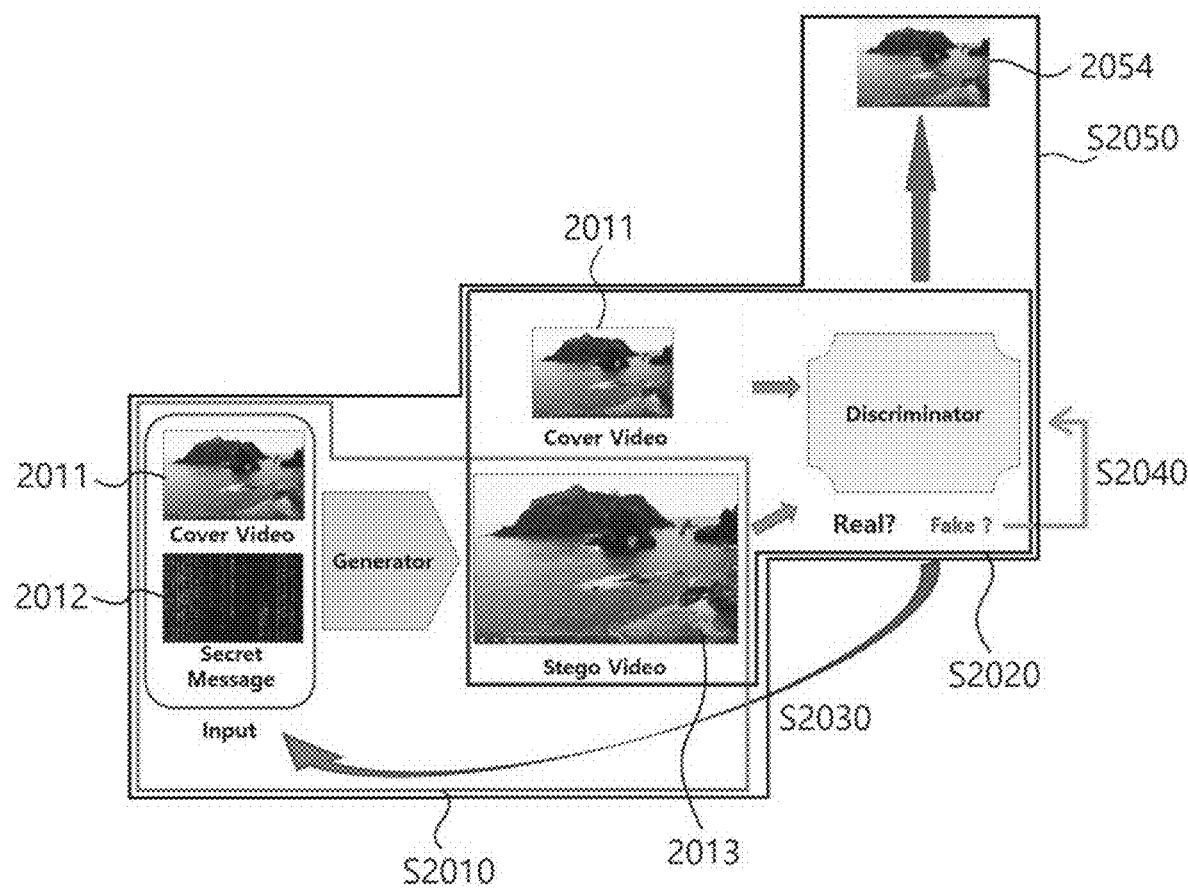

[Figure 3]
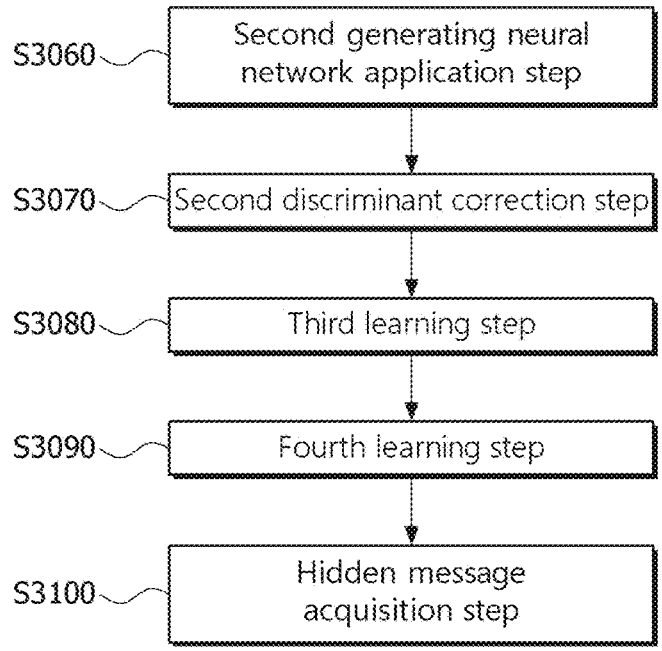
[Figure 4]
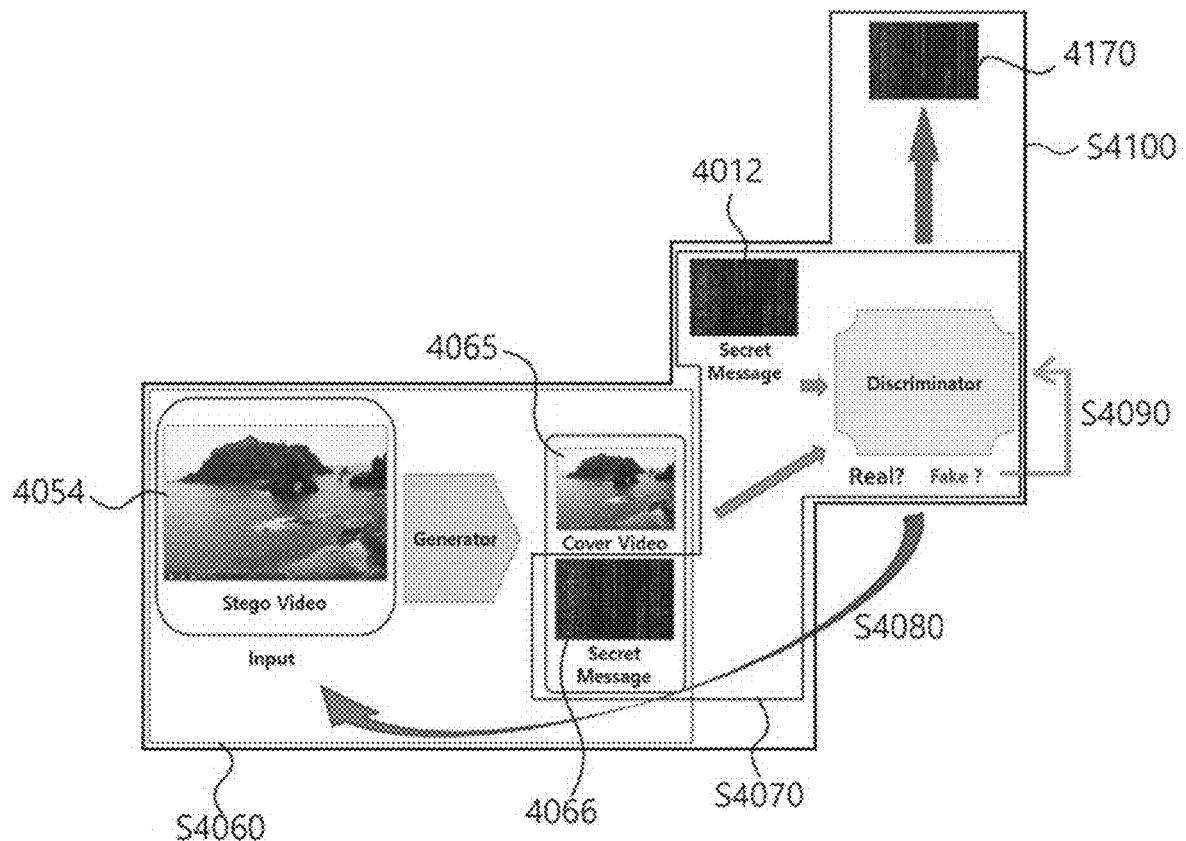

STEGANOGRAPHY METHOD

RELATED APPLICATION

This application claims the benefit of priority of Korea Patent Application No. 10-2021-0114766 filed on Aug. 30, 2021, the contents of which are incorporated by reference as if fully set forth herein in their entirety.

FIELD AND BACKGROUND OF THE INVENTION

The present application relates to a steganography method and a steganography apparatus using the same.

The need for concealment and protection of important information between data transmission and reception in an open communication network is continuously demanded, and the information transmission and reception field using encryption keys, algorithms and the like and the information security field that focuses on detecting, identifying, and removing the same also continuously develop.

One of these is a steganography technology that the information to be transmitted in files, such as images and sounds, is hidden so that humans cannot detect it, and delivered to the other person.

In the case of such steganography, conventionally, data is manipulated or hidden inside the image file, but recently, various concealment methods using video media have been developed to hide large-capacity data, whereby the process of hiding data inside the video media by using the steganography technology has many considerations compared to the image-based hiding process. For message hiding, in the modulated video and the original cover video, the visual difference between the pixels in the frames, the video stream, the compressed region, and the hidden volume inside the media header and the data region, and the like are compared and utilized, but there are problems that time consumption for refining many data and modulating many frames may be large and the quality of the modulated video may be deteriorated. Therefore, a steganography method for solving these problems is required.

SUMMARY OF THE INVENTION

It is an object of the present application to provide a steganography method capable of simplifying a data refinement process compared to the supervised learning method as AI learns a large amount of data related to steganography encoding and decoding by itself, generating a high-quality stego video close to the cover video to improve the imperceptibility of hidden information as the generator and discriminator conduct mutual learning, hiding the message in the images and/or sounds according to the learning method to secure a high-capacity cache, and securing robustness against third-party detection, monitoring, and removal attacks when learning the detection and avoidance methods of physical and technical detection systems (monitoring equipment, wiretapping equipment and security equipment, etc.), and a steganography apparatus using the same.

In addition, it is an object of the present application to provide a steganography method capable of simplifying a data refinement process compared to the supervised learning method as AI learns a large amount of data related to steganography decoding by itself, and recovering the hidden message close to the original hidden message to improve perceptibility of hidden information as the generator and the discriminator conduct mutual learning, and a steganography apparatus using the same.

In order to solve the above objects, the steganography method of the present application comprises: a first generating neural network application step of embedding an original hidden message in an original cover video to generate a first stego video by applying a first generating neural network thereto; a first discriminant correction step of comparing the first stego video generated in the first generating neural network application step with the original cover video two or more times by using a first discriminant neural network, and correcting it; a first learning step of training the first generating neural network so that the first stego video generated in the first generating neural network application step is determined to be a real video in the first discriminant correction step; a second learning step of training the first discriminant neural network so that when the original cover video is input in the first discriminant correction step, it is determined to be real, and when the video derived from the first generating neural network is input therein, it is determined to be fake; and a second stego video acquisition step of acquiring a second stego video by using a first generative adversarial neural network induced (adversarial training) through a mutual adversarial relationship between the first generating neural network and the first discriminant neural network.

The original cover video may comprise any one or more of images and sounds.

Also, the original hidden message may be embedded in frames per second of the original cover video.

In addition, the embedding method may be a pre-embedding method, an intra-embedding method, or a post-embedding method.

Furthermore, the first discriminant correction step may be a step of repeating a process of comparing frames per second of the first stego video generated in the first generating neural network application step with frames per second of the original cover video, respectively, two or more times by using the first generative adversarial neural network, and correcting the difference between the generated first stego video and the original cover video to be minimized.

Also, the frames per second of the first stego video and the frames per second of the original cover video may be at least one selected from pixels in the frames, a video stream, a compressed area, and a hidden volume inside a media header and a data region.

In addition, the steganography method may further comprise a second generating neural network application step of decoding the second stego video acquired in the second stego video acquisition step to convert it into a decoded cover video and a decoded hidden message by applying a second generating neural network thereto; a second discriminant correction step of comparing the hidden message decoded in the second generating neural network application step with the original hidden message used in the first generating neural network application step two or more times by using a second discriminant neural network, and correcting it; a third learning step of training the second generating neural network so that the decoded hidden message converted in the second generating neural network application step is determined to be a real video in the second discriminant correction step; a fourth learning step of training the second discriminant neural network so that when the original hidden message is input in the second discriminant correction step, it is determined to be real, and when the decoded hidden message derived from the second generating neural network is input therein, it is determined to be fake; and a hidden message acquisition step of acquiring a decoded hidden message by using a second generative adversarial neural network induced (adversarial training) through a mutual adversarial relationship between the second generating neural network and the second discriminant neural network.

Also, the decoded cover video may comprise any one or more of images and sounds.

In addition, the part where the second generating neural network and the second discriminant neural network interact to generate a difference may be one or more selected from the consistency difference of hidden message data and the difference in whether the header and the data region are modulated.

Furthermore, the second discriminant correction step may be a step of repeating a process of comparing the hidden message converted in the second generating neural network application step with the original hidden message used in the first generating neural network application step two or more times by using a second generative adversarial neural network, and correcting the difference between the converted hidden message and the original hidden message to be minimized.

The present application also relates to a steganography apparatus using the steganography method, which comprises a first generating neural network application part for embedding an original hidden message in an original cover video to generate a first stego video by applying a first generating neural network thereto; a first discriminant correction part for comparing the first stego video generated in the first generating neural network application part with the original cover video two or more times by using a first discriminant neural network, and correcting it; a first learning part for training the first generating neural network so that the first stego video generated in the first generating neural network application part is determined to be a real video in the first discriminant correction part; a second learning part for training the first discriminant neural network so that when the original cover video is input in the first discriminant correction part, it is determined to be real, and when the video derived from the first generating neural network is input therein, it is determined to be fake; and a second stego video acquisition part for acquiring a second stego video by using a first generative adversarial neural network induced (adversarial training) through a mutual adversarial relationship between the first generating neural network and the first discriminant neural network.

The steganography apparatus may further comprise: a second generating neural network application part for decoding the second stego video acquired in the second stego video acquisition part to convert it into a decoded cover video and a decoded hidden message by applying a second generating neural network; a second discriminant correction part for comparing the hidden message decoded in the second generating neural network application part with the original hidden message used in the first generating neural network application part two or more times by using a second discriminant neural network, and correcting it; a third learning part for training the second generating neural network so that the decoded hidden message converted in the second generating neural network application part is determined to be a real video in the second discriminant correction part; a fourth learning part for training the second discriminant neural network so that when an original hidden message is input in the second discriminant correction part, it is determined to be real, and when the decoded hidden message derived from the second generating neural network is input therein, it is determined to be fake; and a hidden message acquisition part for acquiring a decoded hidden message by using a second generative adversarial neural network induced (adversarial training) through a mutual adversarial relationship between the second generating neural network and the second discriminant neural network.

According to the steganography method of the present application and the steganography apparatus using the same, they can simplify a data refinement process compared to the supervised learning method as AI learns a large amount of data related to steganography encoding and decoding by itself, can generate a high-quality stego video close to the cover video to improve the imperceptibility of hidden information as the generator and discriminator conduct mutual learning, can hide the message in the images and/or sounds according to the learning method to secure a high-capacity cache, and can secure robustness against third-party detection, monitoring, and removal attacks when learning the detection and avoidance methods of physical and technical detection systems (monitoring equipment, wiretapping equipment and security equipment, etc.).

In addition, according to the steganography method of the present application and the steganography apparatus using the same, they can simplify a data refinement process compared to the supervised learning method as AI learns a large amount of data related to steganography decoding by itself, and can recover the hidden message close to the original hidden message to improve perceptibility of hidden information as the generator and the discriminator conduct mutual learning.

BRIEF DESCRIPTION OF THE SEVERAL VIEWS OF THE DRAWINGS

FIG. 1 is a diagram illustrating a steganography method according to one example of the present application.

FIG. 2 is a diagram illustrating an encoding process to acquire a second stego video.

FIG. 3 is a diagram illustrating a steganography method according to one example of the present application, which further comprises a decoding process.

FIG. 4 is a diagram illustrating a decoding process to acquire a hidden message.

DESCRIPTION OF SPECIFIC EMBODIMENTS OF THE INVENTION

Hereinafter, the steganography method of the present application will be described with reference to the accompanying drawings, and the accompanying drawings are exemplary, where the steganography method of the present application is not limited to the accompanying drawings.

FIG. 1 is a diagram illustrating a steganography method according to one example of the present application. As shown in FIG. 1, the steganography method comprises a first generating neural network application step (S1010), a first discriminant correction step (S1020), a first learning step (S1030), a second learning step (S1040), and a second stego video acquisition step (S1050). The steganography method is performed by a computer program, and comprises the above-described steps, thereby being capable of simplifying a data refinement process compared to the supervised learning method as AI learns a large amount of data related to steganography encoding by itself, generating a high-quality stego video close to the cover video to improve the imperceptibility of hidden information as the generator and discriminator conduct mutual learning, hiding the message in the images and/or sounds according to the learning method to secure a high-capacity cache, and securing robustness against third-party detection, monitoring, and removal attacks when learning the detection and avoidance methods of physical and technical detection systems (monitoring equipment, wiretapping equipment and security equipment, etc.).

The first generating neural network application step is a step of generating (encoding) a first stego video by embedding an original hidden message in an original cover video, which is performed by applying a first generating neural network. In this specification, the term "generating neural network" means a machine learning model that is trained to be capable of generating examples suitable for the purpose by using given data (input vector) to deceive the discriminant neural network as much as possible, and in this specification, the term "discriminant neural network" means to a machine learning model that is trained to be capable of distinguishing real original data from fake examples presented by the generating neural network. Also, in this specification, the term "first generating neural network" means a machine learning model that is trained to be capable of deceiving a first discriminant neural network as much as possible after an original hidden message is embedded in an original cover video to generate a first stego video, and in this specification, the term "first discriminant neural network" means a machine learning model that is trained to be capable of distinguishing the first stego video presented by the first generating neural network from the actual original data. In addition, in this specification, the term "stego video" means a video in which a hidden message is hidden in an original cover video, and in this specification, the term "first stego video" means a stego video that has not undergone the first discriminant correction step, and in this specification, the term "second stego video" means the final stego video with improved imperceptibility by using a first generative adversarial neural network induced (adversarial training) through a mutual adversarial relationship between the first generating neural network and the first discriminant neural network. Furthermore, in this specification, the term "embedding" means pasting an original hidden message to an original cover video. Through this, the original hidden message may be embedded in the original cover video to generate a first stego video.

The original cover video may comprise any one or more of images and sounds. For example, the image may be a background, a foreground, a person, or the like, and the sound may be a sound from a person, an animal, an object, or the like. That is, the original hidden message may be embedded in the above-described type of images and/or sounds. Through this, messages may be hidden in images and/or sounds, thereby securing a high-capacity cache.

In one example, the original hidden message may be embedded in frames per second of the original cover video. The original hidden message may be embedded in frames per second of the original cover video, thereby securing a high-capacity cache.

The embedding method may be a pre-embedding method, an intra-embedding method, or a post-embedding method. The pre-embedding method may be a technique of hiding an original hidden message in an uncompressed original cover video (video stream). Specifically, the pre-embedding method may be divided into a method based on a spatial domain or a method based on a transform domain (frequency, etc.). Also, the intra-embedding method may be a technique of hiding an original hidden message in a compressed region of an original cover video. In addition, the post-embedding method may be a technique of directly inserting an original hidden message into a compressed original cover video (video stream).

The first discriminant correction step is a step of comparing the first stego video generated in the first generating neural network application step with the original cover video two or more times, and correcting it, which is performed using the first discriminant neural network. Specifically, in the first discriminant correction step, the process of repeatedly correcting a part where the first generating neural network and the first discriminant neural network interact with each other to generate a difference is repeatedly performed two or more times until it is determined that after a discriminator compares a first stego video generated by a generator with the original cover video in the first generating neural network application step, there is no difference between the first stego video and the original cover video, and it is possible that a generative adversarial neural network, that is, AI can learn this on its own. Through this, it can simplify a data refinement process compared to the supervised learning method as AI learns a large amount of data related to steganography encoding by itself, can generate a high-quality stego video close to the cover video to improve the imperceptibility of hidden information as the generator and discriminator conduct mutual learning, and can secure robustness against third-party detection, monitoring, and removal attacks when learning the detection and avoidance methods of physical and technical detection systems (monitoring equipment, wiretapping equipment and security equipment, etc.). In this specification, the term "generative adversarial neural network (GAN)" may mean one of the machine learning (ML) methods that automatically create images, videos, voices and the like that are close to reality while a generating neural network and a discriminant neural network compete with each other.

In this specification, the term "two or more times" means a plurality of times, and the upper limit is not particularly limited in that the discriminant correction step must be performed until it is determined that there is no difference.

In one example, the first discriminant correction step may be a step of repeating the process of comparing frames per second of the first stego video generated in the first generating neural network application step with frames per second of the original cover video, respectively by using a first generative adversarial neural network two or more times, thereby correcting the difference between the generated first stego video and the original cover video to be minimized. Through this, it can simplify a data refinement process compared to the supervised learning method as AI learns a large amount of data related to steganography encoding by itself, can generate a high-quality stego video close to the cover video to improve the imperceptibility of hidden information as the generator and discriminator conduct mutual learning, and can secure robustness against third-party detection, monitoring, and removal attacks when learning the detection and avoidance methods of physical and technical detection systems (monitoring equipment, wiretapping equipment and security equipment, etc.).

For example, the frames per second of the first stego video and the frames per second of the original cover video may be at least one selected from pixels in the frames, a video stream, a compressed area, and a hidden volume inside a media header and a data region.

The first learning step is a step of training the first generating neural network, where the machine learning of the first generating neural network is performed such that it is determined that the first stego video generated in the first generating neural network application step is a real video in the first discriminant correction step. Through this, the first generating neural network may deceive the first discriminant neural network so as to determine that the first stego video is a real video.

The second learning step is a step of training the first discriminant neural network, where the machine learning of the first discriminant neural network is performed such that when an original cover video is input in the first discriminant correction step, it is determined to be real, and when a video derived from the first generating neural network is input therein, it is determined to be fake. To do this, machine learning of the first discriminant neural network is performed. Through this, the first discriminant neural network may determine that the video derived from the first generating neural network, that is, the first stego video, is fake.

The second stego video acquisition step is a step of acquiring a second stego video with improved imperceptibility, that is, determined to be very similar to the original cover video, which is performed using a first generative adversarial neural network induced through the mutual adversarial relationship between the first generating neural network and the first discriminant neural network. Through this, it can simplify a data refinement process compared to the supervised learning method as AI learns a large amount of data related to steganography encoding by itself, can generate a high-quality stego video close to the cover video to improve the imperceptibility of hidden information as the generator and discriminator conduct mutual learning, and can secure robustness against third-party detection, monitoring, and removal attacks when learning the detection and avoidance methods of physical and technical detection systems (monitoring equipment, wiretapping equipment and security equipment, etc.).

For example, FIG. 2 is a diagram illustrating an encoding process to acquire a second stego video. As shown in FIG. 2, a first generating neural network application step (S2010) of embedding an original hidden message (2012) in an original cover video (2011) to generate a first stego video (2013) by applying a first generating neural network may be performed, a first discriminant correction step (S2020) of comparing the first stego video generated in the first generating neural network application step with the original cover video by using the first discriminant neural network until it is determined that there is no difference between them, and correcting it, may be performed, and then a first learning step (S2030) of training the first generating neural network so that the first stego video generated in the first generating neural network application step is determined to be a real video in the first discriminant correction step and a second learning step (S2040) of training the first discriminant neural network so that when an original cover video is input in the first discriminant correction step, it is determined to be real, and when an image derived from the first generating neural network is input therein, it is determined to be fake, may be performed, and a second stego video acquisition step (S2050) of acquiring a second stego video (2054) with improved imperceptibility by using a first adversarial neural network induced (adversarial training) through a mutual adversarial relationship between the first generating neural network and the first discriminant neural network may be performed. Through this, it can simplify a data refinement process compared to the supervised learning method as AI learns a large amount of data related to steganography encoding by itself, can generate a high-quality stego video close to the cover video to improve the imperceptibility of hidden information as the generator and discriminator conduct mutual learning, and can secure robustness against third-party detection, monitoring, and removal attacks when learning the detection and avoidance methods of physical and technical detection systems (monitoring equipment, wiretapping equipment and security equipment, etc.).

FIG. 3 is a diagram illustrating a steganography method according to one example of the present application, which further comprises a decoding process. As shown in FIG. 3, the steganography method may further comprise a second generating neural network application step (S3060), a second discriminant correction step (S3070), a third learning step (S3080), a fourth learning step (S3090), and a hidden message acquisition step (S3100). As the steganography method further comprises the above-described steps, it can simplify a data refinement process compared to the supervised learning method as AI learns a large amount of data related to steganography decoding by itself, and can recover the hidden message close to the original hidden message to improve perceptibility of hidden information as the generator and the discriminator conduct mutual learning.

The second generating neural network application step is a step for decoding the second stego video acquired in the second stego video acquisition step to convert it into a decoded cover video and a decoded hidden message, which may be performed by applying a second generating neural network. In this specification, the term "second generating neural network" means a machine learning model that is trained to be capable of deceiving a second discriminant neural network as much as possible after the second stego video is decoded to generate a decoded cover video and a decoded hidden message, and the "second discriminant neural network" means a machine learning model that is trained to be capable of distinguishing the decoded hidden message presented by the second generating neural network from the real original message. Also, in this specification, the term "decoding" means separating a cover video and a hidden message from the second stego video. Through this, the second stego video may be decoded to be converted into a decoded cover video and a decoded hidden message.

The decoded cover video may comprise any one or more of images and sounds. For example, the image may be a background, a foreground, a person, or the like, and the sound may be a sound from a person, an animal, an object, or the like. That is, the decoded hidden message may be decoded from the above-described type of images and/or sounds. Through this, it is possible to recover the decoded hidden message from the images and/or sounds.

The second discriminant correction step is a step of comparing the hidden message decoded in the second generating neural network application step with the original hidden message used in the first generating neural network application step two or more times, and correcting it, which may be performed by using a second discriminant neural network. Specifically, in the second discriminant correction step, the process of comparing, after a discriminator compares the decoded hidden message of the decoded cover video and decoded hidden message converted by a generator in the second generating neural network application step with the original hidden message, the decoded hidden message and the original hidden message until there is no difference, and repeatedly correcting a part where the second generating neural network and the second discriminant neural network interact with each other to generate a difference is repeatedly performed two or more times, and it is possible that a generative adversarial neural network, that is, AI can learn this on its own. Through this, it can simplify a data refinement process compared to the supervised learning method as AI learns a large amount of data related to steganography decoding by itself, and can recover the hidden message close to the original hidden message to improve perceptibility of hidden information as the generator and the discriminator conduct mutual learning.

For example, the part where the second generating neural network and the second discriminant neural network interact to generate a difference may be one or more selected from the consistency difference of hidden message data and the difference in whether the header and the data region are modulated.

In one example, the second discriminant correction step may be a step of repeating a process of comparing the hidden message converted in the second generating neural network application step with the original hidden message used in the first generating neural network application step two or more times by using a second generative adversarial neural network, and correcting the difference between the converted hidden message and the original hidden message to be minimized. Through this, it can simplify a data refinement process compared to the supervised learning method as AI learns a large amount of data related to steganography decoding by itself, and can recover the hidden message close to the original hidden message to improve perceptibility of hidden information as the generator and the discriminator conduct mutual learning.

The third learning step is a step of training the second generating neural network, where the machine learning may be performed so that the decoded hidden message converted in the second generating neural network application step is determined to be a real video in the second discriminant correction step. Through this, the second generating neural network may deceive the second discriminant neural network so as to determine that the decoded hidden message is a real video.

The fourth learning step is a step of training the second discriminant neural network, where the machine learning of the second discriminant neural network may be performed so that when an original hidden message is input in the second discriminant correction step, it is determined to be real, and when the decoded hidden message derived from the second generating neural network is input therein, it is determined to be fake. Through this, the second discriminating neural network may determine that the message derived from the second generating neural network, that is, the decoded hidden message, is fake.

The second stego video acquisition step is a step of acquiring a second stego video with improved imperceptibility, that is, determined to be very similar to the original cover video, which is performed using a first generative adversarial neural network induced through a mutual adversarial relationship between the first generating neural network and the first discriminant neural network.

The hidden message acquisition step is a step of acquiring a decoded hidden message with improved perceptibility, that is, close to the original hidden message, which may be performed by using a second generative adversarial neural network induced through a mutual adversarial relationship between the second generating neural network and the second discriminant neural network. Through this, it can simplify a data refinement process compared to the supervised learning method as AI learns a large amount of data related to steganography decoding by itself, and can recover the hidden message close to the original hidden message to improve perceptibility of hidden information as the generator and the discriminator conduct mutual learning.

For example, FIG. 4 is a diagram illustrating a decoding process to acquire a hidden message. As shown in FIG. 4, a second generating neural network application step (S4060) of decoding the second stego video (4054) acquired in the second stego video acquisition step to convert it into a decoded cover video (4065) and a decoded hidden message (4066) by applying a second generating neural network thereto may be performed, a second discriminant correction step (S4070) of comparing the hidden message decoded in the second generating neural network application step with the original hidden message (4012) two or more times until it is determined that there is no difference by using a second discriminant neural network, and correcting it, may be performed, and then a third learning step (S4080) of training the second generating neural network so that the decoded hidden message converted in the second generating neural network application step is determined to be a real video in the second discriminant correction step and a fourth learning step (S4090) of training the second discriminant neural network so that when the original hidden message is input in the second discriminant correction step, it is determined to be real, and when the decoded hidden message derived from the second generating neural network is input therein, it is determined to be fake, may be performed, and a hidden message acquisition step (S4100) of acquiring a decoded hidden message (4170) by using a second generative adversarial neural network induced (adversarial training) through a mutual adversarial relationship between the second generating neural network and the second discriminant neural network may be performed. Through this, it can simplify a data refinement process compared to the supervised learning method as AI learns a large amount of data related to steganography decoding by itself, and can recover the hidden message close to the original hidden message to improve perceptibility of hidden information as the generator and the discriminator conduct mutual learning.

The present application also relates to a steganography apparatus. The steganography apparatus relates to an apparatus using the above-described steganography method, where the details of the steganography method to be described below may be equally applied by the contents described in the steganography method, so that they will be omitted.

The steganography apparatus is an apparatus using the above-described steganography method, which comprises a first generating neural network application part, a first discriminant correction part, a first learning part, a second learning part, and a second stego video acquisition part. As the steganography apparatus comprises the above-described parts, it can simplify a data refinement process compared to the supervised learning method as AI learns a large amount of data related to steganography encoding by itself, can generate a high-quality stego video close to the cover video to improve the imperceptibility of hidden information as the generator and discriminator conduct mutual learning, and can secure robustness against third-party detection, monitoring, and removal attacks when learning the detection and avoidance methods of physical and technical detection systems (monitoring equipment, wiretapping equipment and security equipment, etc.).

The first generating neural network application part is a part that an original hidden message is embedded in an original cover video to generate a first stego video, which is performed by applying a first generating neural network thereto. Since the detailed description of the first generating neural network application part is the same as that described in the first generating neural network application step, it will be omitted.

The first discriminant correction part is a part that the first stego video generated in the first generating neural network application part is compared with the original cover video two or more times, and corrected, which is performed using a first discriminant neural network. Since the detailed description of the first discriminant correction part is the same as that described in the first discriminant correction step, it will be omitted.

The first learning part is a part for training the first generating neural network, where the machine learning of the first generating neural network is performed so that the first stego video generated in the first generating neural network application part is determined to be a real video in the first discriminant correction part. Since the detailed description of the first learning part is the same as that described in the first learning step, it will be omitted.

The second learning part is a part for training the first discriminant neural network, where the machine learning of the first discriminant neural network is performed so that when an original cover video is input in the first discriminant correction part, it is determined to be real, and when a video derived from the first generating neural network is input therein, it is determined to be fake. Since the detailed description of the second learning part is the same as that described in the second learning step, it will be omitted.

The second stego video acquisition part is a part for acquiring a second stego video with improved imperceptibility, that is, determined to be very similar to the original cover video, which is performed using a first generative adversarial neural network induced through a mutual adversarial relationship between the first generating neural network and the first discriminant neural network. Since the detailed description of the second stego video acquisition part is the same as that described in the second stego video acquisition step, it will be omitted.

The steganography apparatus of the present application may further comprise a second generating neural network application part, a second discriminant correction part, a third learning part, a fourth learning part, and a hidden message acquisition part. As the steganography apparatus further comprises the above-described parts, it can simplify a data refinement process compared to the supervised learning method as AI learns a large amount of data related to steganography decoding by itself, and can recover the hidden message close to the original hidden message to improve perceptibility of hidden information as the generator and the discriminator conduct mutual learning.

The second generating neural network application part is a part for decoding the second stego video acquired in the second stego video acquisition part to convert it into a decoded cover video and a decoded hidden message, which may be performed by applying a second generating neural network. Since the detailed description of the second generating neural network application part is the same as that described in the second generating neural network application step, it will be omitted.

The second discriminant correction part is a part for comparing the hidden message decoded in the second generating neural network application part with the original hidden message used in the first generating neural network application part two or more times, and correcting it, which may be performed using a second discriminant neural network. Since the detailed description of the second discriminant correction part is the same as that described in the second discriminant correction step, it will be omitted.

The third learning part is a part for training the second generating neural network, where the machine learning of the second generating neural network may be performed so that the decoded hidden message converted in the second generating neural network application part is determined to be a real video in the second discriminant correction part. Since the detailed description of the third learning part is the same as that described in the third learning step, it will be omitted.

The fourth learning part is a part for training the second discriminant neural network, where the machine learning of the second discriminant neural network may be performed so that when an original hidden message is input in the second discriminant correction part, it is determined to be real, and when a decoded hidden message derived from the second generating neural network is input therein, it is determined to be fake. Since the detailed description of the fourth learning part is the same as that described in the fourth learning step, it will be omitted.

The hidden message acquisition part is a part for acquiring a decoded hidden message with improved perceptibility, that is, close to the original hidden message, which may be performed using a generative adversarial neural network induced through a mutual adversarial relationship between the second generating neural network and the second discriminant neural network. Since the detailed description of the secret message acquisition part is the same as that described in the secret message acquisition step, it will be omitted.

REFERENCES

S1010, S2010: first generating neural network application step
S1020, S2020: first discriminant correction step
S1030, S2030: first learning step
S1040, S2040: second learning step
S1050, S2050: second stego video acquisition step
S3060, S4060: second generating neural network application step
S3070, S4070: second discriminant correction step
S3080, S4080: third learning step
S3090, S4090: fourth learning step
S3100, S4100: hidden message acquisition step
2011: original cover video
2012, 4012: original hidden message
2013: first stego video
2054, 4054: second stego video
4065: decoded cover video
4066: decoded hidden message
4170: decoded hidden message with improved perceptibility

What is claimed is:

1. A steganography method comprising:
a first generating neural network application step of embedding an original hidden message in a video stream of an original cover video to generate a first stego video by applying a first generating neural network thereto;
a first discriminant correction step of comparing the first stego video generated in the first generating neural network application step with the original cover video two or more times by using a first discriminant neural network, and correcting it;
a first learning step of training the first generating neural network so that the first stego video generated in the first generating neural network application step is determined to be a real video in the first discriminant correction step;

a second learning step of training the first discriminant neural network so that when the original cover video is input in the first discriminant correction step, it is determined to be real, and when the video derived from the first generating neural network is input therein, it is determined to be fake; and a second stego video acquisition step of acquiring a second stego video by using a first generative adversarial neural network induced (adversarial training) through a mutual adversarial relationship between the first generating neural network and the first discriminant neural network;

wherein the original cover video is a video stream comprising any one or more of images and sounds;

wherein the embedding method is one of pre-embedding, intra-embedding, and a post-embedding.

2. The steganography method according to claim 1, wherein the first discriminant correction step is a step of repeating a process of comparing a video stream of the first stego video generated in the first generating neural network application step with the video stream of the original cover video, respectively, two or more times by using the first generative adversarial neural network, and correcting the difference between the generated first stego video and the original cover video to be minimized.

3. The steganography method according to claim 2, wherein the difference between the video stream of the first stego video and the video stream of the original cover video is one or more selected from a visual difference of pixels in the frames, a video stream difference, a compressed region difference, and a hidden volume difference inside a media header and a data region.

4. The steganography method according to claim 1, further comprising:

a second generating neural network application step of decoding the second stego video acquired in the second stego video acquisition step to convert it into a decoded cover video and a decoded hidden message by applying a second generating neural network thereto;

a second discriminant correction step of comparing the hidden message decoded in the second generating neural network application step with the original hidden message used in the first generating neural network application step two or more times by using a second discriminant neural network, and correcting it;

a third learning step of training the second generating neural network so that the decoded hidden message converted in the second generating neural network application step is determined to be a real video in the second discriminant correction step;

a fourth learning step of training the second discriminant neural network so that when the original hidden message is input in the second discriminant correction step, it is determined to be real, and when the decoded hidden message derived from the second generating neural network is input therein, it is determined to be fake; and a hidden message acquisition step of acquiring a decoded hidden message by using a second generative adversarial neural network induced (adversarial training) through a mutual adversarial relationship between the second generating neural network and the second discriminant neural network.

5. The steganography method according to claim 4, wherein the decoded cover video comprises any one or more of images and sounds.

6. The steganography method according to claim 4, wherein the part where the second generating neural network and the second discriminant neural network interact to generate a difference is one or more selected from the consistency difference of hidden message data and the difference in whether the header and the data region are modulated.

7. The steganography method according to claim 4, wherein the second discriminant correction step is a step of repeating a process of comparing the hidden message converted in the second generating neural network application step with the original hidden message used in the first generating neural network application step two or more times by using a second generative adversarial neural network, and correcting the difference between the converted hidden message and the original hidden message to be minimized.

8. A steganography apparatus, which relates to an apparatus using the steganography method according to claim 1, comprising:

a first generating neural network application part for embedding an original hidden message in the video stream of an original cover video to generate a first stego video by applying a first generating neural network thereto;

a first discriminant correction part for comparing the first stego video generated in the first generating neural network application part with the original cover video two or more times by using a first discriminant neural network, and correcting it;

a first learning part for training the first generating neural network so that the first stego video generated in the first generating neural network application part is determined to be a real video in the first discriminant correction part;

a second learning part for training the first discriminant neural network so that when the original cover video is input in the first discriminant correction part, it is determined to be real, and when the video derived from the first generating neural network is input therein, it is determined to be fake; and a second stego video acquisition part for acquiring a second stego video by using a first generative adversarial neural network induced (adversarial training) through a mutual adversarial relationship between the first generating neural network and the first discriminant neural network, wherein the original cover video is a video stream comprising one or more of images and sounds;

wherein the embedding method is one of pre-embedding, -intra-embedding, and post-embedding.

9. The steganography apparatus according to claim 8, further comprising:

a second generating neural network application part for decoding the second stego video acquired in the second stego video acquisition part to convert it into a decoded cover video and a decoded hidden message by applying a second generating neural network;

a second discriminant correction part for comparing the hidden message decoded in the second generating neural network application part with the original hidden message used in the first generating neural network application part two or more times by using a second discriminant neural network, and correcting it;

a third learning part for training the second generating neural network so that the decoded hidden message converted in the second generating neural network application part is determined to be a real video in the second discriminant correction part;

a fourth learning part for training the second discriminant neural network so that when an original hidden message is input in the second discriminant correction part, it is determined to be real, and when the decoded hidden message derived from the second generating neural network is input therein, it is determined to be fake; and a hidden message acquisition part for acquiring a decoded hidden message by using a second generative adversarial neural network induced (adversarial training) through a mutual adversarial relationship between the second generating neural network and the second discriminant neural network.

* * * * *